Oct. 7, 1958 E. MEZGER 2,855,109
HYDRAULIC CRANE DEVICE FOR HANDLING MOLDING BOX PARTS
Filed July 11, 1955 3 Sheets-Sheet 1
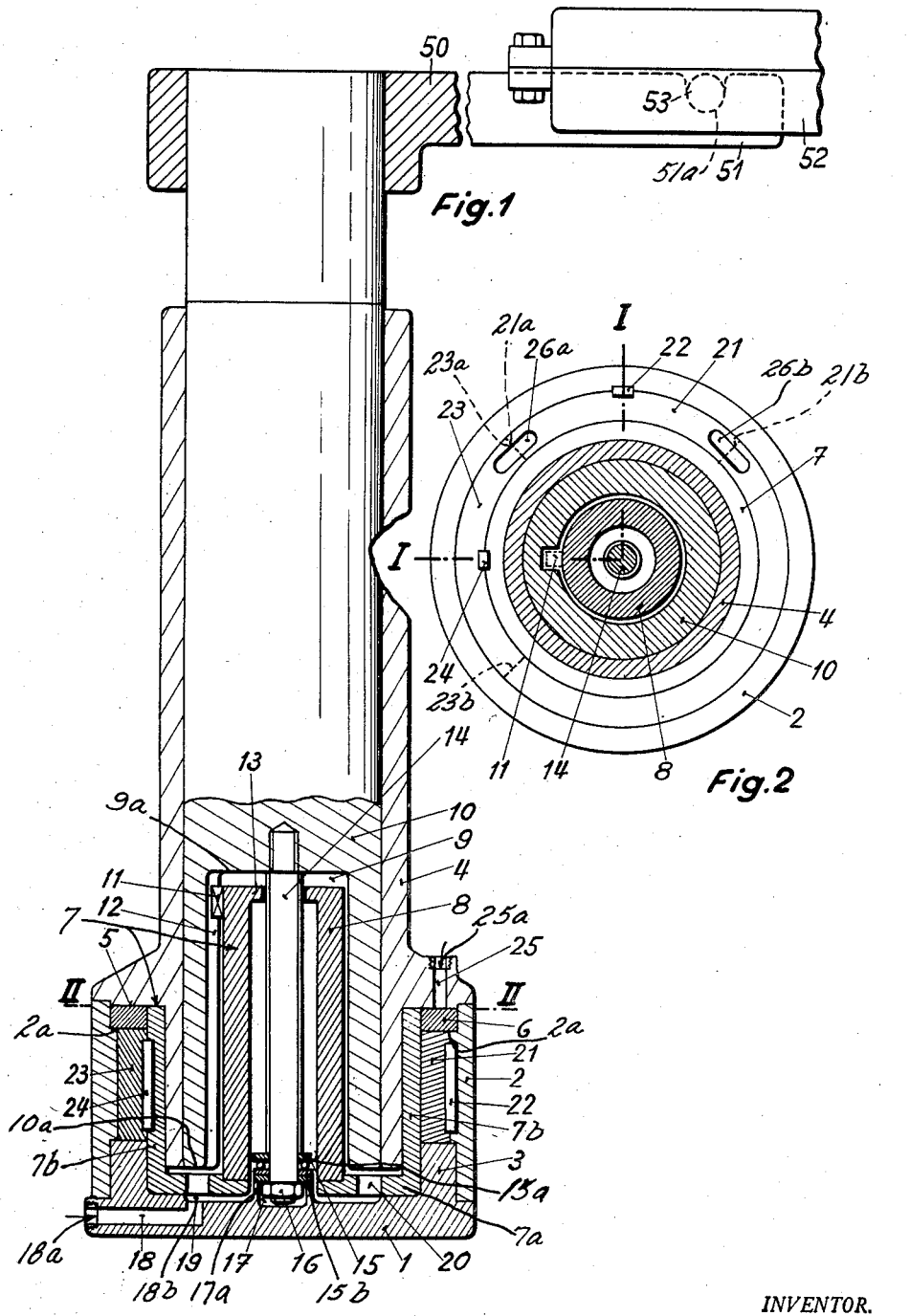
INVENTOR.
EDUARD MEZGER
BY Taulmin & Taulmin
ATTORNEYS Oct. 7, 1958 E. MEZGER 2,855,109
HYDRAULIC CRANE DEVICE FOR HANDLING MOLDING BOX PARTS
Filed July 11, 1955 3 Sheets-Sheet 2
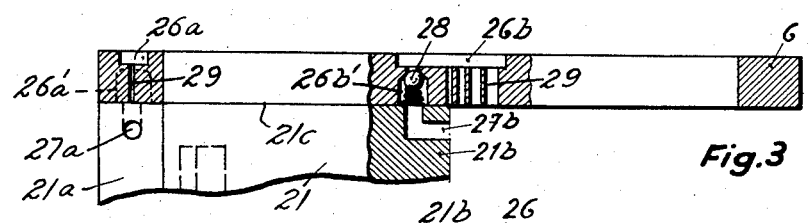
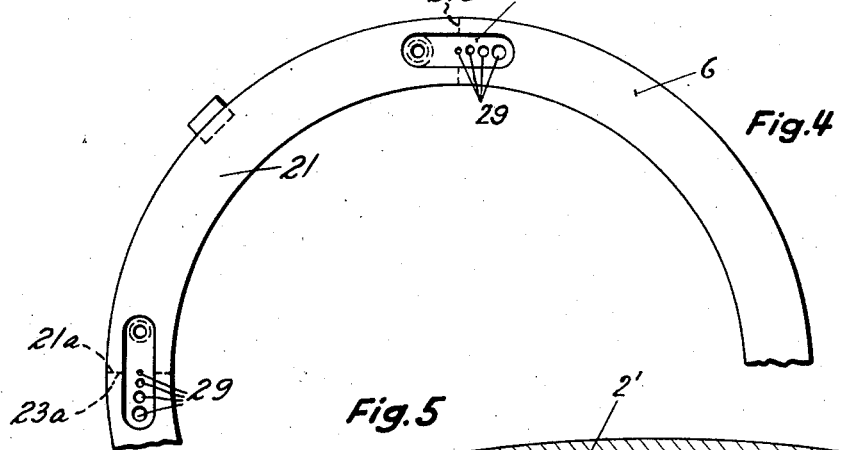
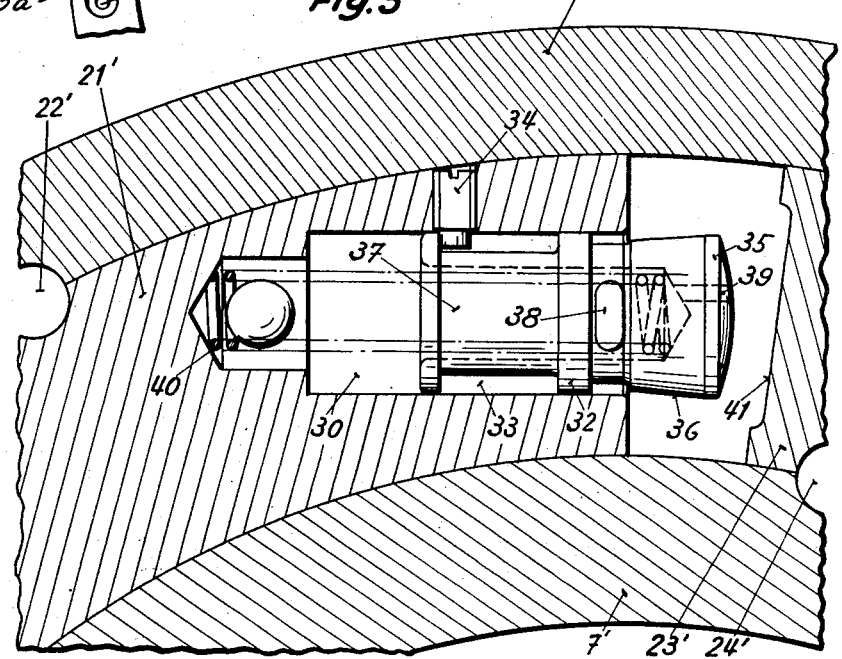
INVENTOR.
EDUARD MEZGER
BY Toulmin & Toulmin
ATTORNEYS Oct. 7, 1958 E. MEZGER 2,855,109
HYDRAULIC CRANE DEVICE FOR HANDLING MOLDING BOX PARTS
Filed July 11, 1955 3 Sheets-Sheet 3
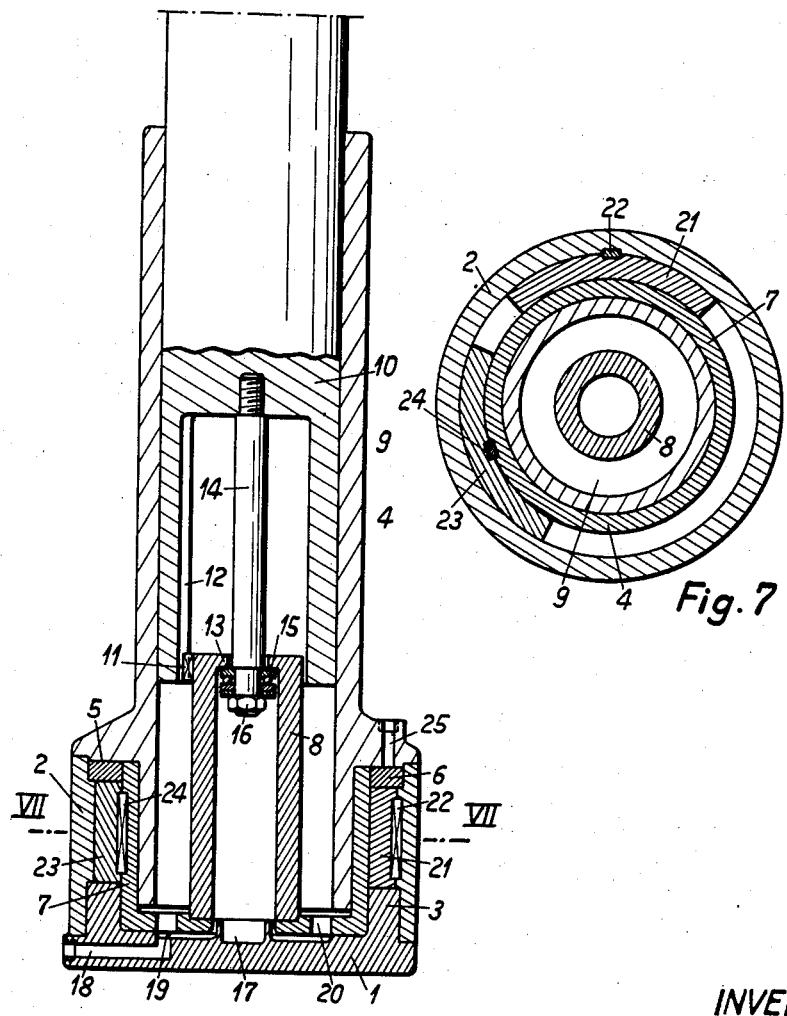
INVENTOR:
EDUARD MEZGER
BY: Toulmin & Toulmin
ATTORNEYS United States Patent Office 2,855,109
Patented Oct. 7, 1958

2,855,109

HYDRAULIC CRANE DEVICE FOR HANDLING MOLDING BOX PARTS

Eduard Mezger, Kallnach, Switzerland

Application July 11, 1955, Serial No. 521,294

Claims priority, application Switzerland July 9, 1954

7 Claims. (Cl. 212—34)

This invention relates to a hydraulic crane device for handling molding box parts.

This crane device according to the invention serves in particular for lifting parts such as upper boxes, cheeks, and lower boxes of molding boxes, off the molding machine, and loading these molding parts on to transporting vehicles. The crane device according to the invention may also be used for closing a mold, for instance, by superimposing the upper box of a mold on to the lower box or boxes.

The crane device comprises a base plate, at least one vertically disposed guiding cylinder which is rigidly mounted on the base plate, a plunger or piston, for upward and downward movement carrying a horizontally disposed jib, and a rotary member adapted for rotational displacement by a determined angle about the vertical longitudinal axis of the aforesaid cylinder, so as to rotate the aforesaid plunger hydraulically without following the displacement of the latter in vertical direction. Furthermore, the crane device according to the invention comprises means for applying hydraulic pressure to the plunger and to the rotary member independently of each other. The rotary member thus serves to rotate the crane device, while the plunger serves to raise and lower the same. Rotation of the rotary member takes place between two stop positions provided inside the aforesaid cylinder by the arrangement of two stop or abutting members therein.

The jib of the crane device according to the invention may be fitted with at least one, and preferably two grabs, each of which serves for seizing a part of the molding box. In case the two halves of a molding box are formed on a twin molding machine, or on two molding machines, arranged side by side, these parts can be taken off the twin molding machine, or the two molding machines, as the case may be, at the same time.

The drawing represents, by way of example, the embodiment of the object of this invention and an embodiment variant of a single detail by way of example being:

Fig. 1 an axial section, to the broken line I—I of Fig. 2, through the crane device for taking parts of molding boxes off the molding machine and for transposing them to a truck or the like with the plunger of this device in its lowermost position;

Fig. 2 a section to the line II—II of Fig. 1;

Fig. 3 an axial section through a detail on a larger scale;

Fig. 4 a top view on Fig. 3, i. e. on the details there shown;

Fig. 5 a section through another embodiment of a detail of this invention;

Fig. 6 shows the crane device according to the invention with the plunger in its uppermost position;

Fig. 7 is a horizontal cross section along the line VII—VII of Fig. 6.

Referring now to the drawings more in detail, the embodiment of the crane device according to the invention shown in Figures 1 to 4, comprises a base plate 1, on which a vertical cylinder 2 is rigidly mounted. The lower portion of cylinder 2 fits snugly about a guiding ring 3 which is arranged at the top face of base plate 1, to which it is rigidly attached in the case shown in Figure 2, so as to form an integral part thereof. A hollow guiding column 4 rests with a flange 5 on the upper end surface of cylinder 2, and is permanently rigidly mounted on said cylinder. From this flange 5, a lower end portion of column 4 extends downwardly into the cylinder 2 and guiding ring 3, while being spaced from both. Cylinder 2 possesses an internal shoulder 2a, on which there is arranged a bearing ring 6 which abuts, with its upper surface, against the bottom face of flange 5 of guiding column 4, and is rigidly attached to the latter. A rotary member 7 consists of an outer cylindrical portion 7b, an annular bottom portion 7a, having a central opening, and a hollow cylindrical central portion 8 which is rigidly mounted on the aforesaid annular bottom 7a about the central opening of the latter. This rotary member is rotatably supported, on the one hand, in the guiding ring 3 of base plate 1, and, on the other hand, in the bearing ring 6, the upper end of the outer surface of cylindrical portion 7b resting against the inner cylindrical surface of ring 6. The inner cylindrical portion 8 acts as a catch or driver for the plunger 10 by protruding into a cylindrical recess 9 provided in the lower portion of the plunger. This plunger 10 is rotatable and axially displaceable in upward or downward direction inside the guiding column 4. A keyway 12 is cut into the cylindrical inner wall of recess 9 and extends from top to bottom. A key 11 is rigidly attached to the upper end of the outer cylindrical wall of catch 8 and engages the aforesaid keyway 12 so as to couple plunger 10 rotatably with catch 8 and consequently with the rotary member 7. The catch 8 is provided at its upper end with an inwardly directed flange 13. At the center of the bottom 9a of recess 9 of plunger 10, a stud 14 is screwed into plunger 10 and extends downwardly along the central axis of the crane device. This step 14 bears at its lowermost end a thrust ball bearing 15 which is held in position on the threaded lower end of stud 14 by means of a nut 16.

In the center of base plate 1, there is provided a recess 17 adapted to receive in its interior the lowermost end of stud 14 and nut 16 screwed thereon. The plunger 10 can be displaced axially inside the guiding column 4. It can be displaced in an upward direction until the upper ring 15a of the thrust ball bearing 15 abuts against the flange 13 of catch 8 and in downward direction until the base ring 15b of bearing 15 comes to rest upon the surrounding wall 17a of recess 17 of base plate 1.

In base plate 1, there is further provided a port or channel 18 which leads from an inlet 18a to an outlet 18b. The latter opens into an annular trough-shaped recess 19 provided in the upper surface of base plate 1 intermediate wall 17a of recess 17 and guiding ring 3. A pressure medium such as, for instance, pressure oil, may pass through channel 18 and recess 19 of base plate 1 and through a plurality of ports or bores 20 provided in the bottom portion 7a of rotary member 7 into recess 9 of plunger 10 and thus act upon plunger 10 to raise the latter in guiding column 4.

In the interior of the annular chamber between the cylinder 2 and the outer cylindrical portion of rotary member 7, which chamber is limited at the bottom by guiding ring 3 and at the top by bearing ring 6, there is provided a stationary cylinder segment 21 which is secured against rotation by means of a key 22 fitting in corresponding grooves in the outer wall of segment 21 and the inner wall surface of cylinder 2. This segment has an angle at the center of 90°. Another cylinder segment 23 of similar shape as segment 21 is secured by means of a key 24 to the outer cylindrical portion of the rotary member 7 and is rotatable in the interior of the aforesaid chamber between cylinder 2 and rotary member 7 between the limits set by the presence of segment 21 in this chamber. Thus, segment 23 may be rotated from the position illustrated in Figures 2 and 7 in which its vertically extending end surface 23a abuts the corresponding end surface 21a of 21 to the position in which its opposite end surface 23b will abut against the corresponding end surface 21b of stationary segment 21. If, as is the case in the illustrated embodiment, both segments 21 and 23 have an angle at the center of 90°, the rotary segment 23 may be rotated by an angle of 180°, and will thus rotate the rotary member 7, and, due to the key connection between portion 8 of the latter and plunger 10, also the latter about the same angle.

Rotation of rotary member 7 and plunger 10 connected therewith is effected by applying pressure on the above described rotatable segment 23 either at the end surface 23a or the end surface 23b thereof, wherefore a pressure medium is introduced into the chamber between cylinder 2 and rotary member 7. The pressure medium may be a pressure oil. For the purpose of introducing the pressure medium, two channels 25 are provided in the flange 5 on the outside of guiding column 4. These channels 25 are provided with threaded inlets 25a which permit to connect thereto conduits (not shown) for the pressure oil. These channels 25 open at their lower end into elongated chambers 26a and 26b provided in the upper annular surface of bearing ring 6 as shown in Figures 2, 3 and 4. These chambers 26a and 26b are arranged in the bearing ring 6 in such a manner that they extend, by half their length, over the end portions of cylinder segment 21 adjacent the end surfaces 21a and 21b of segment 21. From each of these chambers 26a and 26b a channel 26a' and 26b' leads downwardly to the bottom surface of ring 6, and registers with a corresponding channel 27a and 27b respectively provided in the stationary segment 21, and leading from the top surface 21c of the latter to the vertically extending end surfaces 21a and 21b respectively of the segment 21, thereby opening into the chamber between cylinder 2 and rotary member 7. Check valves 28 are provided in both channels 26a' and 26b' as shown in Figure 3. The pressure medium introduced through channel 25 into, for instance, chamber 26a and from there through channel 26a' into channel 27a presses against the end surface 23a of rotary segment 23 and pushes the same (in counter-clockwise direction in the example shown in Figures 2 and 7), until, ultimately, segment 23 reaches its other end position in which its end surface 23b abuts against the corresponding surface 21b of segment 21. The pressure oil filling the empty chamber space between end surfaces 23b and 21b cannot escape through passages 27b and 26b' because the latter is blocked by the respective check valve 28. The medium escapes, however, through a plurality of channels or bores 29, which connect the interior of the chamber between cylinder 2 and rotary member 7 with the elongated chamber 26b directly, without passing through segment 21c. These bores 29 are of different diameter, the one being at the greatest distance from the cylinder segment 21 having the largest diameter, and that bore which is nearest to cylinder segment 21 having the smallest diameter, and having half its cross-sectional surface closed by the aforesaid segment. When the rotary member 7 is moved from its position shown in Figures 2 and 7, to its opposite end position, the pressure medium filling the chamber between end surfaces 23b and 21b is pushed out of the chamber through all those bores 29 which open directly into chamber 26b. As the cylinder segment 23 approaches with its end surface 23b the end surface 21b of segment 21, it closes first the bore 29 having the widest diameter and successively all other bores, so that the expulsion of the pressure medium from the constantly diminishing space between surfaces 23b and 21b is progressively throttled. This leads to an effective breaking of the rotational movement of rotary member 7 until, finally, the end surface 23b of the rotary segment 23 comes to rest gently, i. e. free from shock, against the end surface 21b of stationary segment 21, irrespective of whether the opposite side 23a of segment 23 is under the thrust of a pressure medium of higher or lower pressure. A similar, progressively acting throttle valve may be provided with the pressure medium channel 18 in order to prevent an abrupt shock of plunger 10 hitting the base plate 1, when the plunger descends in the guiding column 4.

At the top end of plunger 10 there is arranged a jib 50 which is filled with a bifurcated grab 51 which serves to grasp a molding box part 52, such as, for instances, a lower or upper box, or a cheek; studs 53, fixed on the side walls of such part being inserted in a groove or recess 51a of grab 51. The grab is suitably designed in such a manner that the position of the grasped molding box part may be inverted.

The above described crane device according to the invention, which is to serve for taking molding box parts off a molding machine and setting them down on a truck or a similar vehicle, is preferably installed in the vicinity of a molding machine in such a manner that, when the plunger 10 is in its lowermost position, and the cylinder segment 23 attached to rotary member 7 bears with its one vertical end surface against the corresponding end surface of the stationary segment 21, the recesses 51a in the two arms of bifurcated grab 51 of jib 50 arranged at the top of plunger 10, register exactly with, and are just below, the studs 53 of molding box part 52 when the latter is positioned on the table of the molding machine and ready to be lifted from the latter. By admitting pressure oil through the inlet 18a and channels 18 and 19 to the lower end surface 10a and the recessed bottom surface 9a of plunger 10, the latter is caused to move upwardly in the guiding column 4, whereby the jib and the grab attached to the top end of plunger 10 are also raised, and the studs 53 of molding box part 52 are engaged by the recesses 51a of the grab so that the molding box part 52 is lifted off the table of the molding machine. In certain other types of molding machines, the molding box part may be lifted off the molding table by lowering the table instead of raising the jib 50, so that the studs 53 on both sides of box part 52 are lowered into the recesses 51a of grab 51, and the molding box part thus remains suspended in the grab.

The molding box part now suspended in the grab of jib 50 is then swung about and out of the range of the molding machine by causing the plunger 10 to be rotated through the key connection 11 to the internal cylinder portion 8 of rotary member 7, which rotation is brought about by causing the rotary segment 23 connected by key 24 to rotary member 7 to be rotated by applying oil pressure in the manner described in detail hereinbefore, to either end surface 23a or 23b of that segment. The segment and together therewith the jib 50 may be arrested in a desired position, maximally at 180°, when the molding box part has reached a position above a truck or the like vehicle, whereupon the molding box part may be lowered into the truck by causing plunger 10 to be lowered in guiding column 4. The latter movement is brought about by releasing pressure oil from the interior of recess 9 through bores 20 of the rotary member 7 and channels 18 of base plate 1. During the slewing motion of the jib, the molding box part suspended from the grab, may, if desired, be inverted, the movement of inversion being accomplished in a conventional manner by hydraulic, pneumatic or mechanical means.

The crane device according to the invention as described in detail above, thus ensures an easy, safe and smooth removal and transfer of molding box parts from the table of a molding machine on to a truck or to any other desired place, as well as an inversion of the molding box.

The slewing reach of the jib 50 mounted on plunger 10 may be made larger or smaller than 180° by setting a corresponding angle of rotation through a suitable adaptation of the angles at the center of the cylinder segments 21 and 23 respectively. The described device may further be mounted on a carriage which may be moved by means of a system of guides or the like, and which may thus be moved, together with the molding box part suspended therefrom to a working place remote from the molding machine, from the table of which the molding box part has been lifted.

It is also possible to combine two or more devices of the described kind to form a group, fitted with at least two vertical cylinders with plungers, jibs and grabs, wherein the plungers may be rotatable and axially displaceable, independently from each other. The maximum stroke of the different plungers may be of the same length, or of different lengths, so as to facilitate the deposition of a molding box part on another molding box part.

In the embodiment shown in Figure 5, which relates to a valve for throttling the discharge of the pressure means from the chamber between the cylinder segments 21 and 23 respectively, reference numeral 2' designates the cylinder arranged on the base plate and numeral 7' the rotary member inside the latter. In the space between the cylinder 2' and the rotary member 7', the cylinder segments 21' and 23' are arranged, the first one being fixed to the cylinder 2' by means of a key 22', and the second one to the rotary member 7' by means of a key 24'. Each end surface of the cylinder segment 21' is provided with a bore 30 having an inlet 31 for the pressure medium. In this bore 30a plunger 32 having a reduced portion 33 is guided for axial displacement. The end of a stop screw 34 lodged in the cylinder segment 21', extends into this recess 33 in order to limit the stroke of the plunger 32 inside the bore 30. The plunger 32 has at its outer end a curved head 35 with a tapered neck portion 36, the diameter of which being so dimensioned that this head completely closes the bore 30 when the plunger 32 is in its inner limit position. The plunger 32 is further provided with an internal bore 37 which does not extend through the entire length of the plunger but communicates with a radial passage 38 provided in the neck portion 36 of the head 35. The head 35 of the plunger has a narrow port 39 which communicates with the bore 37. By means of a pressure spring 40 lodged inside the bore 30 the plunger 32 is urged to adopt its outer limit position in the bore 30. The cylinder segment 23' has a recess 41 at its end face for the head 35 of plunger 32.

When, by revolving the rotary member 7', the cylinder segment 23' approaches the cylinder segment 21', the pressure medium between these two cylinder segments 21' and 23' respectively can escape through the annular gap between the head 35, i. e. its tapered neck portion 26 and the orifice of the pocket hole 30, and past the port 38 enter the bore 37 of the plunger 32, and from here pass through the pocket hole 30 to the outlet 31, whereto the drain piping (not shown) of the pressure medium is connected. With further rotation of the cylinder segment 23', this segment abuts against the head 35 of the plunger 32, urging the latter against the action of the pressure spring 40 further into the pocket hole 30. Due to this further rotation, the clearance, i. e. the cross section of passage for the pressure medium between the tapered neck portion 36 of the head 35 and the orifice of the pocket hole 30 diminishes gradually until the pressure medium can only escape through the narrow channel 38 past the head of the plunger 32. This progressive throttling of the outflow of the pressure medium prevents a hard shock of the cylinder segment 23' setting against the cylinder segment 21' and thus provides smooth braking of the rotary motion of the rotary member 7'.

It will be understood that this invention is susceptible to modification in order to adapt it to different usages and conditions and, accordingly, it is desired to comprehend such modifications within this invention as may fall within the scope of the appended claims.

I claim:

1. A hydraulic crane device for taking parts of molding boxes off a molding machine and transferring them to a transport vehicle, comprising, a base plate, a vertical cylinder rigidly mounted thereon, a guiding ring rigidly attached on said base plate, an annular shoulder provided on said cylinder, a bearing ring resting on said shoulder in said cylinder, a vertical guiding column rigidly mounted on said cylinder, a plunger inside said guiding column being guided for rotary and axial displacement therein, a jib mounted on the top end of said plunger, a grab for each part of a molding box being arranged on said jib, a rotary member housed inside said cylinder, said rotary member comprising a cylindrical portion rotatably mounted intermediate said bearing ring and said guiding ring, an annular bottom portion and an inner cylindrical catch portion rigidly mounted on said bottom portion coaxially with said cylindrical portion, said plunger being provided at its lower end with a centrally disposed cavity, said catch portion of said rotary member extending into said cavity, a keyway in the lateral wall of said cavity, key means rigidly attached to said catch portion while engaging said keyway for longitudinal displacement therein while causing said plunger to rotate in unison with said rotary member, a rotary piston rigidly attached to said rotary member, means for coupling said rotary member to said plunger for rotation of both together while said plunger alone is capable of individual axial displacement as well as of simultaneous axial displacement alone and rotation together with said rotary member, hydraulic means for exerting pressure from below on said plunger so as to selectively raise and lower the same, stop means for limiting the axial displacement of said plunger, limit means for limiting the rotation of said rotary member, and means for independently applying pressure to said rotary piston so as to rotate the same together with said rotary member and said plunger toward either of said limit means.

2. A device as set forth in claim 1, wherein a port for passage of the pressure medium is provided in said base plate, said port communicating with the space in said guiding column below said plunger and, a throttle valve provided in said port, which valve progressively throttles the outflow of the pressure medium from said guiding column.

3. A device as described in claim 1, wherein an annular space is provided between said cylinder and said rotary member, and below said bearing ring and above said guiding ring, said rotary piston being shaped as a staionary cylinder segment and being housed in said annular space, said limit means comprising a cylindrical segment rigidly attached to said cylinder and having two opposite vertical end surfaces facing said annular space, and wherein conduit means are provided through said bearing ring and said limit means opening in said end surfaces of the latter and being adapted for the passage of a pressure medium therethrough so as to displace said rotary piston of said rotary member inside said annular space between said end surfaces of said limit means.

4. A device as described in claim 3, wherein said conduit means comprise two oblong chambers in the top surface of said bearing, said oblong chambers being so disposed above said end surfaces of said stationary cylinder segment as to extend partly over and partly beyond the latter, a channel for admittance of pressure medium leading from each of said oblong chambers through said bearing ring downwardly and through said stationary cylinder segment at an angle to open in the adjacent end surface thereof, a check valve inside each of said channels in said bearing ring, and a plurality of discharge channels leading from that portion of said oblong chambers extending beyond said stationary segment downwardly through said bearing ring to said annular space below the same, said discharge channels being arranged in such a manner that upon rotation of said rotary piston in said annular space, said piston closes one by one the orifices of said discharge channels, thereby progressively throttling the discharge flow of pressure medium from said annular space.

5. A device as described in claim 4, wherein the diameter of said discharge channels diminishes from that furthest away toward that nearest to said stationary cylinder segment.

6. A device as described in claim 3, wherein said conduit means comprise a pocket hole provided in each of said end surfaces of said stationary cylinder segment, a channel through said bearing ring and said guiding column for admitting a pressure medium to said pocket hole, said plunger having a curved head, a tapered neck portion, a tail end and a circumferential recess, a plunger in said pocket hole, a pressure spring lodged in said pocket hole for moving said plunger, a stop screw laterally disposed in the wall of said stationary cylinder segment and extending into said pocket hole within said circumferential recess of said pocket hole plunger so as to limit the stroke of the latter, said plunger, snugly closing the orifice of the same, when driven home into said pocket hole by said rotary piston approaching said stationary cylinder segment.

7. A device as described in claim 6, wherein said plunger is provided with an opening behind the neck portion of the plunger head, a bore in said plunger open to the tail end of the same, said bore communicating with said opening, and with a small port in said plunger head communicating with said bore, so that the pressure medium enclosed in said annular space between the end surface of said stationary cylinder segment and the approaching end surface of said rotary piston is first discharged through an annular gap between said neck portion of the plunger head and the orifice of said pocket hole and through said opening and bore in said plunger and from there through channel in said bearing ring and guiding column, whereupon during further approach of said rotary piston said plunger being driven home by the end surface of said rotary piston gradually reduces the cross-sectional area of flow of said pressure medium between said plunger head neck portion and said orifice of said pocket hole, thereby throttling the discharge of said pressure medium, the latter finally escaping only through the narrow port in the plunger head.

References Cited in the file of this patent
UNITED STATES PATENTS

| | | |
|---|---|---|
| 479,468 | Shaw | July 26, 1892 |
| 2,489,326 | Rockstrom et al. | Nov. 29, 1949 |
| 2,774,483 | Raymond | Dec. 18, 1956 |

FOREIGN PATENTS

| | | |
|---|---|---|
| 866,837 | Germany | Feb. 12, 1953 |